No. 608,793. Patented Aug. 9, 1898.
G. VON POST.
AUTOMATIC SEED PLANTER.
(Application filed May 2, 1898.)

(No Model.)

Witnesses:
E. B. Bolton

Inventor:
Gustaf von Post
By his Attorneys

UNITED STATES PATENT OFFICE.

GUSTAF VON POST, OF SAFSJOSTROM, SWEDEN.

AUTOMATIC SEED-PLANTER.

SPECIFICATION forming part of Letters Patent No. 608,793, dated August 9, 1898.

Application filed May 2, 1898. Serial No. 679,452. (No model.)

*To all whom it may concern:*

Be it known that I, GUSTAF VON POST, engineer, of Safsjostrom, in the county of Smaland, Kingdom of Sweden, do hereby declare the nature of my invention for Improvements in Automatic Seed-Planters and in what manner the same is to be performed to be particularly described and ascertained in and by the following statement.

The operation of sowing forest seeds in the manner heretofore usual involves great trouble and expense. Chiefly on this account the large majority of forest-owners neglect restoring their worked-off districts into forest-bearing land by planting seeds therein, relying instead on the natural sowing process, which, however, owing to its irregularity and uncertainty, in most cases leaves a great deal to be desired.

The present invention relates to an apparatus by means of which one man, without appreciable difficulty or trouble, can in one day plant seeds over a greater territory than can be done in several working days in the usual manner of sowing, said apparatus, moreover, planting the seeds in a manner closely resembling the natural sowing.

The apparatus is illustrated in the accompanying drawings.

Figure 1:
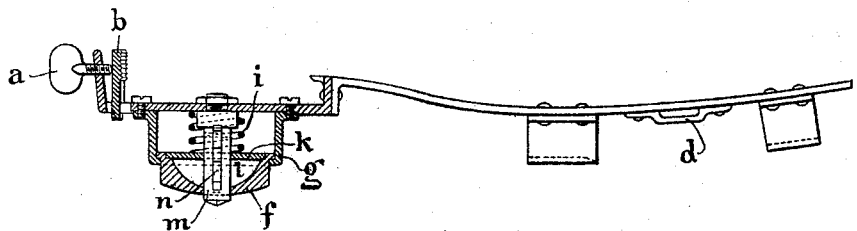
Figure 4:
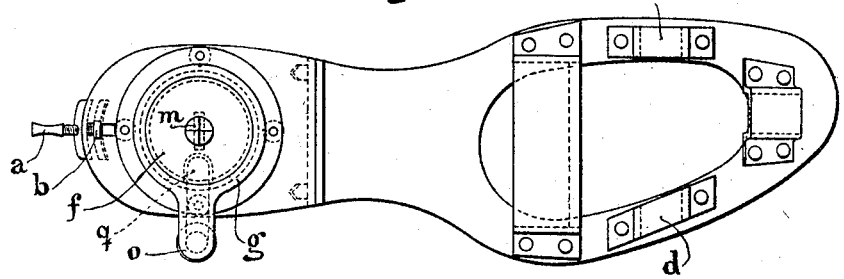
Figure 3:
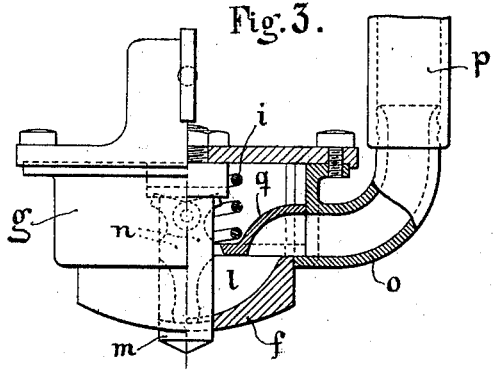
Figure 6:
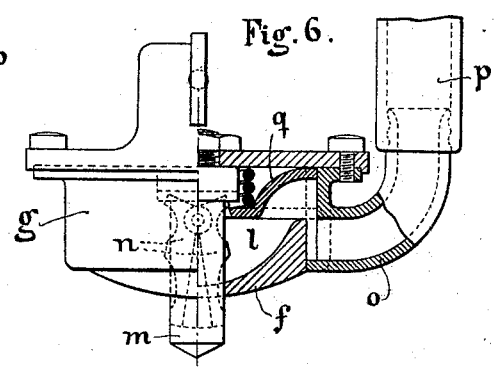
Figure 2:
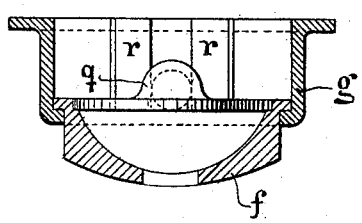
Figure 5:
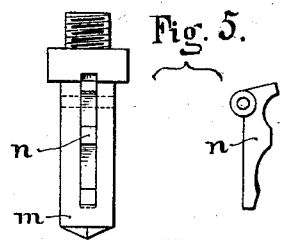

Figure 1 is a longitudinal view, partly in section; Fig. 2, a vertical section of the cylders; Figs. 3 and 6, rear views, partly in section, of the apparatus in two different positions; Fig. 4, the apparatus viewed from below, and Fig. 5 a detail view of the stud and of one of the arms placed therein.

The apparatus is preferably to be arranged at the hind end of a plate intended to be attached to the bottom of the foot and provided for this purpose with suitable fastening devices—for instance, a clamping-piece $b$, located at the rear end of the plate and adapted to be pressed against the heel of the shoe by means of a screw $a$, and a couple of ears $d$ at the under side of the plate, through which a strap may be passed and laid over the fore part of the foot. The apparatus proper, which evidently may be attached under the heel of the shoe in any other manner, consists of a ring or cylinder $g$, open at the bottom, said ring being rigidly attached to the heel end and made to embrace a second cylinder $f$, which is closed at the bottom and can move up and down in the former. The latter cylinder is covered by a lid $k$, its interior thus forming a closed chamber $l$, and said chamber embraces an immovable spike or stud $m$, pointed at the lower end and passing down through the bottom and lid of the lower cylinder, forming a guide for the latter. On the lid $k$ acts a spiral spring $i$, tending to press the cylinder $f$ outward. In the stud or spike is made a longitudinal slit which terminates at a slight distance above the point of the stud, and in this slit are situated one or more arms $n$, Fig. 5, movable in the vertical plane and provided at their lower end, on the outside, with a recess (or shaped so as to not quite fill the slit) and at the top with a lug projecting beyond the circumference of the stud.

The interior of the ring $g$, by means of a tube $o$ and a hose $p$, attached to it, is connected with a seed-magazine hopper, which is carried, for instance, by a belt fixed around the waist of the person using the apparatus. The lid $k$ is provided with an aperture leading to the chamber $l$, but covered by a cap $q$, which has a second aperture located directly opposite the outlet of the tube $o$, said aperture being shifted upward past the outlet of the tube $o$ when the cylinder $f$ is pressed upward. In order to prevent rotary motion of the cylinder $f$ as it moves up and down and to always keep the above-mentioned aperture of the cap $q$ in its correct position in relation to the outlet of the tube $o$, guide-strips $r$, Fig. 2, are arranged at the inner side of the ring $g$. By this arrangement the advantage is gained that the seeds do not clog in the tube $o$ and that there will be a regular feed at the proper time into the seed-chamber $l$, while at the same time the seeds are not injured in passing from the tube $o$ to the movable cylinder $f$.

The apparatus operates as follows: When the heel is placed on the ground, the cylinder $f$ is pressed up into the ring $g$ and the lower part of the stud or spike $m$ is uncovered, the spike at the same time entering to a corresponding depth into the ground and making a hole in it. As the cylinder $f$ moves upward its lid $k$ strikes against the lugs projecting in its path from the arms $n$, said arms consequently being swung outward through the end of the slit that now lies outside the cylinder $f$ and the arms throwing out the seeds collected outside them in the lower part of the slit into the hole made by the spike or stud in the ground. When the foot is again lifted, the cylinder $f$ is returned to its original position by the spring $i$, and a fresh quantity of seeds is introduced into the seed-chamber $l$ from the hose $p$ through the cap $q$, which in this position of the cylinder communicates with the tube or passage $o$. In the next step with the foot the cylinder $f$ is again raised and a fresh quantity of seeds is thrown out, while at the same time the seed-chamber is shut off from the seed-magazine by the elevation of the orifice of the cap above the outlet of the tube $o$.

The arrangement for moving the arms $n$ outward as the cylinder $f$ is elevated may be varied, for instance, by using in place of the lugs at the upper portion of said arms springs which act to press the lower ends of said arms outward as soon as the said ends project beyond the cylinder.

At every step of the foot, to which the apparatus is attached, a quantity of seeds will thus be deposited in the ground just below the surface and at the edge of the hole made with the stud or spike. In actual trials it has been found that the apparatus deposits on an average seven seeds a step, which corresponds to a seed consumption of approximately 3.8 hectograms of pine-seed per hectare when the number of steps is twelve thousand.

The use of the apparatus involves no trouble, and it can be readily taken apart for repairs and inspection. It is intended to be used only when the ground is dry or damp, not when it is wet.

The apparatus can evidently be used for planting all kinds of seed, though being especially adapted for forest-seed planting.

Having now particularly described the nature of my said invention and in what manner the same is to be performed, I declare that what I claim is—

1. An improved automatic seed-planter consisting of a ring or guiding-cylinder $g$, adapted to be attached under the foot, and a cylinder $f$ movable in the former and depressed by a spring, said cylinder containing a chamber $l$ which is in communication with a seed-magazine and embraces a stud $m$ projecting through its bottom and provided with a vertical slit in which are located one or more arms $n$ fulcrumed at their upper ends and acting to discharge the seed from in front of them when the movable cylinder $f$ rises through contact with the ground.

2. A seed-planter comprising a guiding-cylinder $g$, a movable cylinder $f$ having a chamber $l$ with a lid $k$ having an aperture therein, a cover for said aperture having an opening opposite a seed-inlet opening in the wall of the guiding-cylinder and a supply-pipe leading to the inlet-opening in the guiding-cylinder, the movement of the cylinder $f$ serving to open and close communication between the supply-pipe and the chamber $f$, substantially as described.

3. A seed-planter comprising an outer cylinder with a supply-pipe leading thereto from an opening in the wall thereof and an inner cylinder having a chamber with a discharge-opening leading therefrom, the said inner cylinder being movably supported in relation to the outer cylinder and being adapted by its vertical movement to control the seed-supply, substantially as described.

In witness whereof I have hereunto set my hand in presence of two witnesses.

GUSTAF VON POST.

Witnesses:
   H. TELANDER,
   T. RISBERG.